(12) United States Patent
Chen

(10) Patent No.: US 7,532,977 B2
(45) Date of Patent: May 12, 2009

(54) PORTABLE PERSONAL POSITIONER

(76) Inventor: Yu-Yu Chen, 65-08 182 St., Fresh Meadow, NY (US) 11365

( * ) Notice: Subject to any disclaimer, the term of this patent is extended or adjusted under 35 U.S.C. 154(b) by 946 days.

(21) Appl. No.: 11/092,739

(22) Filed: Mar. 30, 2005

(65) Prior Publication Data

US 2006/0229809 A1 Oct. 12, 2006

(51) Int. Cl.
*G01C 21/00* (2006.01)
(52) U.S. Cl. .................. 701/207; 702/150; 702/151; 600/595; 482/8; 482/57; 482/84; 342/357.1
(58) Field of Classification Search ............... 701/207; 702/150, 160; 368/11, 14; 600/595; 482/8, 482/57, 84; 340/901, 985; 342/357.1
See application file for complete search history.

(56) References Cited

U.S. PATENT DOCUMENTS

| | | | | |
|---|---|---|---|---|
| 5,285,398 | A * | 2/1994 | Janik | 361/683 |
| 5,491,651 | A * | 2/1996 | Janik | 361/683 |
| 5,555,490 | A * | 9/1996 | Carroll | 361/686 |
| 5,572,401 | A * | 11/1996 | Carroll | 361/683 |
| 5,581,492 | A * | 12/1996 | Janik | 361/683 |

(Continued)

FOREIGN PATENT DOCUMENTS

CA 2305633 A1 * 10/2001

(Continued)

OTHER PUBLICATIONS

The Advanced Health and Disaster Aid Network: A Light-Weight Wireless Medical System for Triage; Tia Gao; Massey, T.; Selavo, L.; Crawford, D.; Bor-rong Chen; Lorincz, K.; Shnayder, V.; Hauenstein, L.; Dabiri, F.; Jeng, J.; Chanmugam, A.; White, D.; Sarrafzadeh, M.; Welsh, M.;Biomedical Circuits and Systems, IEEE Transactions on,vol. 1, Issue 3.*

(Continued)

*Primary Examiner*—Cuong H Nguyen
(74) *Attorney, Agent, or Firm*—Bacon & Thomas, PLLC

(57) ABSTRACT

A portable personal positioner for determining the geographical position of the user without employing the Global Positioning System (GPS) comprising a signal/position display and a traveling speed/distance measuring sensor, wherein the signal/position display is equipped with microprocessor, magneto-resistive sensor and altimeter to measure traveling direction signal along X and Y axis and position signal along Z axis of the use respectively, and to transmit the measured signals to the microprocessor for recording and access, meanwhile the traveling speed/distance measuring sensor is also to measure traveling speed and distance of a user and transmit the measured signals by means of wired or wireless transmission to the microprocessor for recording and access, after data processing from the microprocessor, to obtain the data of traveling speed, traveling distance, geographical position and track of traveling of the user within a time period and display on LCD screen of the signal/position display to determine geographical position without employing the satellite navigation system of GPS; besides, the personal positioner may be further equipped with a cardiac pulse detector for detecting the pulse of heart of a user, and the detected pulse signal is transmitted to the microprocessor of the signal/position display by means of wired or wireless transmission for recording and access to display electrocardiogram or cardiac pulse signal of a user on LCD screen of the signal/position display.

21 Claims, 5 Drawing Sheets

U.S. PATENT DOCUMENTS

| | | | |
|---|---|---|---|
| 5,657,232 A * | 8/1997 | Ishikawa et al. | 701/215 |
| 6,057,966 A * | 5/2000 | Carroll et al. | 359/630 |
| 6,356,856 B1 * | 3/2002 | Damen et al. | 702/160 |
| 6,493,652 B1 * | 12/2002 | Ohlenbusch et al. | 702/160 |
| 6,549,915 B2 * | 4/2003 | Abbott et al. | 707/104.1 |
| 6,611,789 B1 * | 8/2003 | Darley | 702/160 |
| 6,876,947 B1 * | 4/2005 | Darley et al. | 702/160 |
| 6,882,955 B1 * | 4/2005 | Ohlenbusch et al. | 702/160 |
| 6,898,550 B1 * | 5/2005 | Blackadar et al. | 702/182 |
| 7,055,101 B2 * | 5/2006 | Abbott et al. | 715/744 |
| 7,113,450 B2 * | 9/2006 | Plancon et al. | 368/10 |
| 7,171,331 B2 * | 1/2007 | Vock et al. | 702/160 |
| 7,200,517 B2 * | 4/2007 | Darley et al. | 702/160 |
| 7,254,516 B2 * | 8/2007 | Case et al. | 702/182 |
| 7,353,137 B2 * | 4/2008 | Vock et al. | 702/173 |
| 7,428,471 B2 * | 9/2008 | Darley et al. | 702/182 |
| 7,428,472 B2 * | 9/2008 | Darley et al. | 702/182 |
| 2002/0022551 A1 | 2/2002 | Watterson et al. | 482/8 |
| 2002/0054174 A1 * | 5/2002 | Abbott et al. | 345/863 |
| 2003/0163287 A1 * | 8/2003 | Vock et al. | 702/187 |
| 2004/0233788 A1 * | 11/2004 | Plancon et al. | 368/11 |
| 2005/0216138 A1 * | 9/2005 | Turung | 701/3 |
| 2006/0136173 A1 * | 6/2006 | Case et al. | 702/182 |
| 2006/0229809 A1 * | 10/2006 | Chen | 701/213 |
| 2007/0123806 A1 * | 5/2007 | Bouvier et al. | 600/595 |
| 2007/0242339 A1 * | 10/2007 | Bradley | 359/237 |
| 2008/0082254 A1 * | 4/2008 | Huhtala et al. | 701/201 |

FOREIGN PATENT DOCUMENTS

| | | |
|---|---|---|
| JP | 3303174 B2 * | 7/2002 |
| JP | 3303175 B2 * | 7/2002 |

OTHER PUBLICATIONS

Proactive health care underpinned by embedded and mobile technologies;Hwang-Cheng Wang; Jia-Chi Lin; Shiang-Ren Yang; Ping Chang; Jun-Yan Chen; Yu-Ren Guo; Computer and Information Science, 2005. Fourth Annual ACIS International Conference on, 2005 pp. 453-460, Digital Object Identifier 10.1109/ICIS.2005. 104.*

A Scalable telemedicine architecture for under developed countries. A case study: Democratic Republic of Congo; Kidiamboko, S.; Mancini, A.; Longhi, S.; Spalazzi, L.; Control and Automation, 2008 16th Mediterranean Conference on; Jun. 25-27, 2008 pp. 866-871; Digital Object Identifier 10.1109/MED.2008.4602255.*

Forms of wearable computer; Woolley, S.I.; Cross, J.W.; Ro, S.; Foster, R.; Reynolds, G.; Baber, C.; Bristow, H.; Schwirtz, A.; Eurowearable, 2003. IEE, Sep. 4-5, 2003 pp. 47-52, Digital Object Identifier 10.1049/ic:20030146.*

IEEE Recommended Practice for Electric Systems in Health Care Facilities; Aug. 29, 2007 pp. c1-482, Digital Object Identifier 10.1109/IEEESTD.2007.4299432.*

* cited by examiner and a cardiac pulse signal detector installed separately on different parts of the user's body having the function of determining the geographical position and detecting the heart pulse of the user.

PORTABLE PERSONAL POSITIONER

BACKGROUND OF THE PRESENT INVENTION

1. Field of the Present Invention

The invention relates to a portable personal positioner, particularly a multifunctional personal positioner without employing GPS.

2. Description of Prior Act

The Global Positioning System is a system designed for determining the precise position of an object in the global area range which can perform the function of radio-navigation, positioning, time transfer, telecommunication and surveillance. The wide variety application of GPS includes applying in automobile navigation system, portable computer such as automobile computer, notebook computer and PDA etc., and wireless hand-held type equipment such as cell phone, beeper and personal positioner.

However, as for the personal positioner by GPS the following drawbacks have caused this type of personal positioner inconvenient in use:

1. The personal positioner by GPS navigation system has a large size and heavy weight that caused this type of positiones not suitable to be worn on wrist.
2. Disconnection or poor signal receiving always occurs due to the terrain and its features when the user carrying the personal positioner by GPS navigation system passes through high building, woods and tunnel, or inside of a room.
3. The personal positioner by GPS navigation system doesn't work inside a room or on the street having high building.
4. The personal positioner by GPS navigation system has very high power consumption rate. The battery needs to be recharged or replaced only 1~2 days of use.
5. The material cost of ICS of the personal positioner by GPS system is too high that causes this type of positioner unable to be popularized.

SUMMARY OF THE PRESENT INVENTION

In view of the above, the major purpose of the invention is to provide a light weight, handy portable type personal positioner for helping the user to determine the geographical position without being affected by the terrain and its features, and depending the navigation by GPS.

The said positioner comprises a signal/position display and a traveling speed/distance measuring sensor wherein the signal/position display has microprocessor, magneto-resistive sensor and altimeter, and the traveling direction signal of the user along X axis and Y axis as well as the altitude position signal of the user along Z axis can be obtained through the magneto-resistive sensor and altimeter respectively, and these signals are then transmitted to the microprocessor of the signal position display for accuse, meanwhile the traveling speed and distance data are obtained through traveling speed/distance measuring sensor, and are transmitted by wired or wireless transmission means to the microprocessor of the signal/position display for access, and then the input signals are processed through calculation, statistical treatment, superposition and graphic data processing to obtain the data of traveling speed, distance, geographical position and track of the user within a period of time which are then displayed on the LCD screen of the signal/position display so that the geographical position of the user can be determined without depending on satellite navigation system.

Another purpose of the invention is to provide a personal positioner which, in addition to without the need to depend on satellite navigation system to determine the geographical position, has the function of detecting the heart pulse of the user by further incorporating the positioner with a cardiac pulse signal detector in addition to the aforesaid signal/position display and traveling speed/distance measuring sensor, and the heart pulse signal obtained through the cardiac pulse signal detector is transmitted to the microprocessor of the signal/position display by wired or wireless transmission means for recording and access, and the electrocardiogram data or the data from cardiac pulse signal detector can be displayed on the LCD screen of the signal/position display.

BRIEF DESCRIPTION OF THE DRAWING FIGURES

Figure 6:
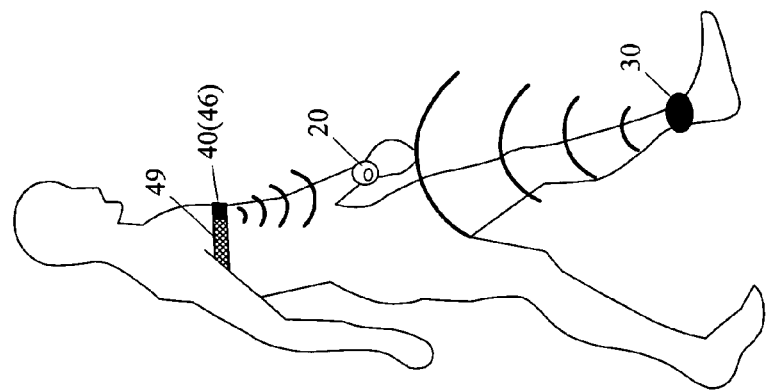
Figure 5:
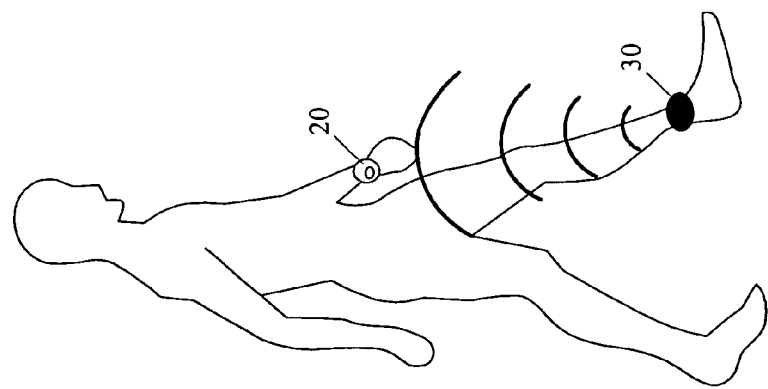
FIG. 5 is the schematic drawing of showing of a personal positioner of the invention which comprises a signal/position display and a traveling speed/distance measuring sensor separately carried on the wrist and on the lower part of leg of the user and the signal being transmitted through wireless signal transmission means.

FIG. 6 is the schematic drawing of showing the personal positioner shown in FIG. 5 further comprising a wireless cardiac pulse signal transmitter and a cardiac pulse radio signal receiver installed inside the signal/position display corresponding to the signal transmitter to enable the personal positioner provide with function of detecting heart pulse signal in addition to the function of positioning.

Figure 7:
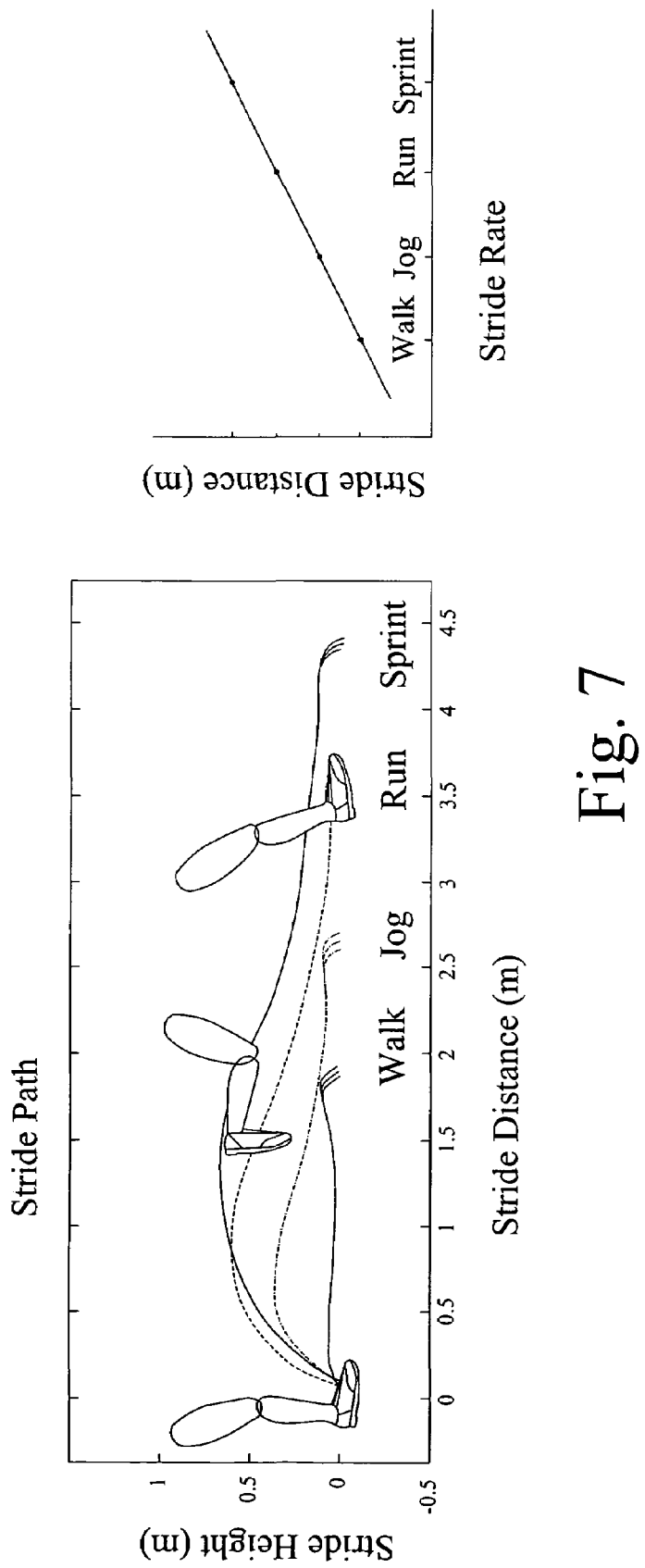

FIG. 7 is the schematic drawing of showing the operational theory of traveling speed/distance measuring sensor used on the personal positioner of the invention which can calculate the traveling speed and distance of the user in walking, jogging, running and sprint based on specific condition of the user of walking, jogging, running and sprint.

DETAILED DESCRIPTION OF THE PREFERRED EMBODIMENTS

Figure 1:
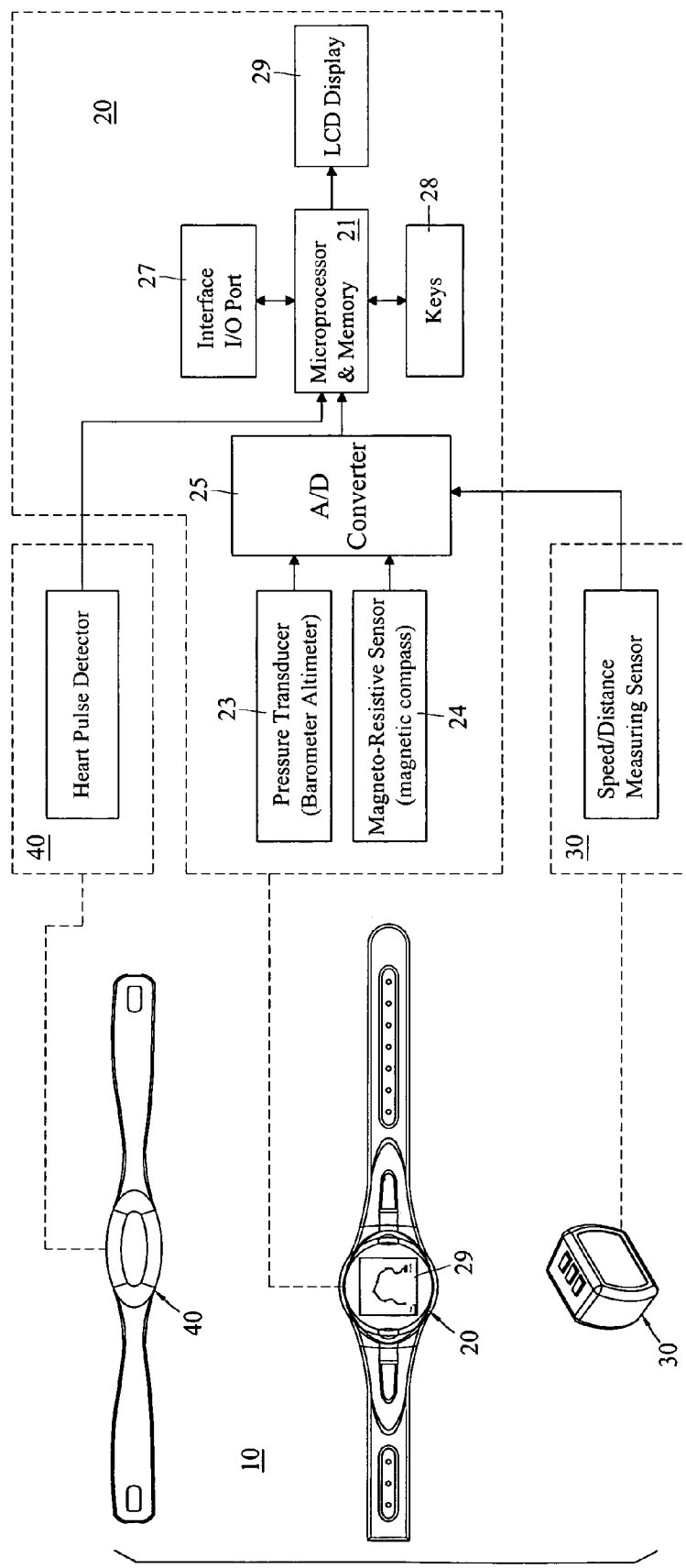
FIG. 1 is the schematic drawing of the structure of the embodiment of the personal positioner disclosed in the invention by wired transmission means.
Figure 2:
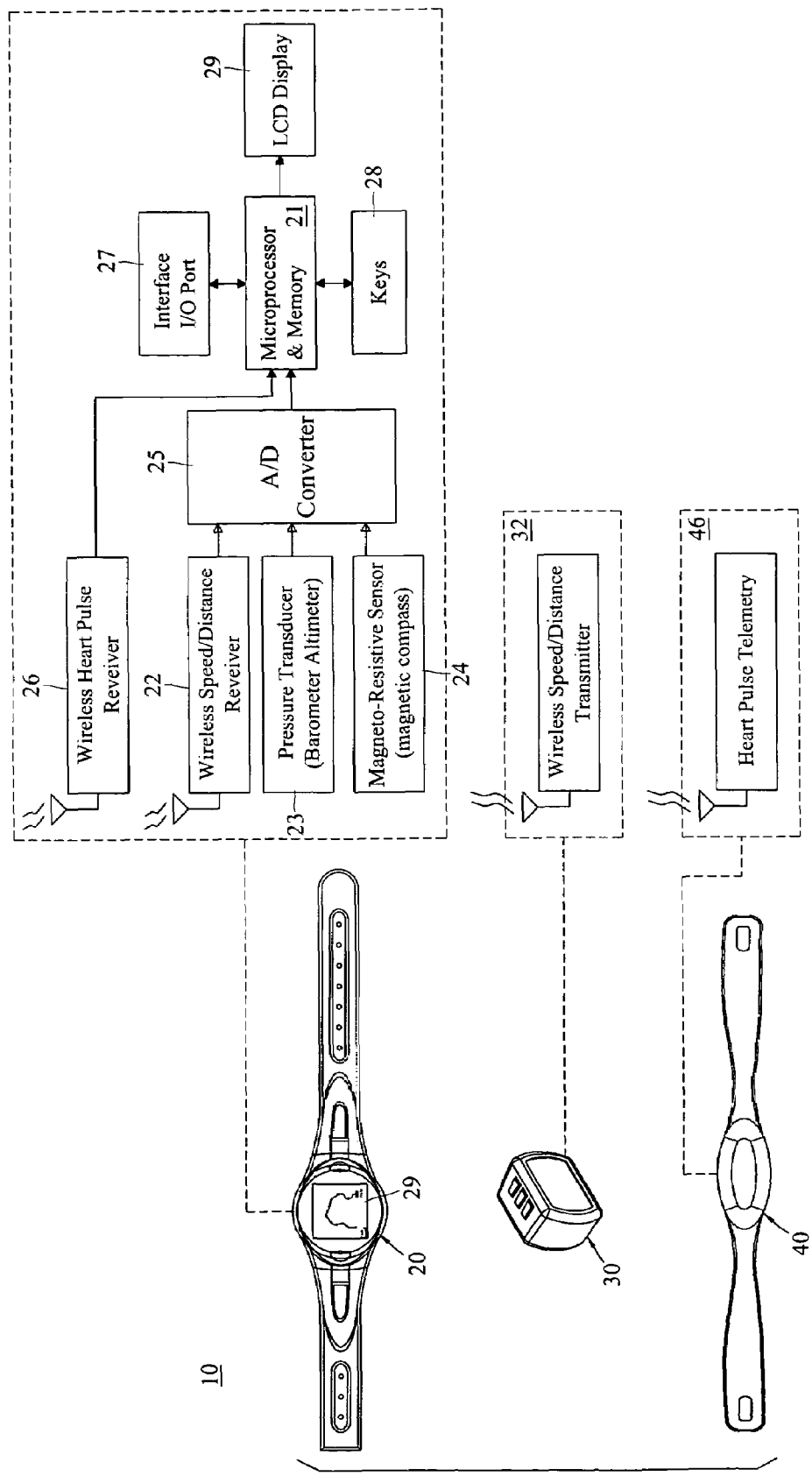
FIG. 2 is the schematic drawing of the structure of the embodiment of the personal positioner disclosed in the invention by wireless transmission means.

As shown in FIG. 1 and FIG. 2 the personal positioner (10) disclosed in the invention is a small size, light weight, handy portable apparatus for helping the user to determine the geographical position and detect the heart pulse signal without being affected by the terrain and its features and the need to use Satellite Navigation System of GPS.

As illustrated in the following are two examples of embodiment, one of which comprises a signal/position display 20 and traveling speed/distance measuring sensor 30 having the function of determining the geographical position, and another example of embodiment comprises a signal/position display 20, a traveling speed/distance measuring sensor 30 and a cardiac pulse signal detector 40 possessing the function of determining the geographical position, and detecting the heat pulse of the user.

And, the signal transmission means between traveling speed/distance measuring sensor 30 or cardiac pulse signal detector 40 and the signal/position display 20 can be either in the form of wired transmission by employing signal transmission wire as shown in FIG. 1, or in the form of wireless transmission by employing radio-frequency or infrared rays.

Also as shown FIG. 1, the signal/position display 20 of the invention comprises at least a microprocessor 21, an A/D converter 25, and a magneto-resistive sensor (or electronic compass) 24, however the more preferred embodiment of the invention is to further include an altimeter 23 installed in the signal/position display 20.

Further, as shown in FIG. 2 when the signal transmission between the traveling speed/distance measuring sensor 30 and the signal/position display 20 is achieved by means of wireless transmission, the traveling speed/distance measuring sensor 30 shall be a wireless speed/distance signal transmitter 32, and the signal/position display 20 shall be equipped with a wireless speed/position signal receiver 22 to receive the radio frequency signal or infrared rays signal from the wireless speed/distance signal transmitter 32, and transmit the signal to the microprocessor 21 for recording and access through A/D converter 25 of the signal/position display 20.

Similarly, when the signal transmission between the cardiac pulse signal detector 40 and the signal/position display 20 is achieved by means of wireless signal transmission, the cardiac pulse signal detector 40 shall be a wireless cardiac pulse signal transmitter 46, and the signal/position display 20 shall be equipped with a cardiac pulse radio signal receiver 26 for receiving the radio-frequency signal or infrared rays signal from the wireless cardiac pulse signal transmitter 46, and the signal shall be transmitted to the microprocessor 21 for recording and access.

The altimeter 23 of the signal/position display 20 is an atmospheric pressure sensor such as a barometer which can measure the atmospheric pressure and convert it into altitude of the location of the user.

Therefore, by employing the altimeter 23 of the signal/position display 20 the altitude for location of the user in Z axis or the traveling speed of the user in Z axis can be obtained, and converted into digital signal by A/D converter 25, and then transmitted to the microprocessor 21 for recording and access.

The magneto-resistive sensor (or electronic compass) 24 of the signal/position display 20 is a high precession displacement and angle sensor such as simple magnetometer or fluxgate compass which can measure and obtain the orientation of the user along X and Y axis and the angular displacement or plane position in longitude and latitude of the user.

Therefore, by employing the magneto-resistive sensor (or electronic compass) 24 of the signal position display 20 the orientation and speed of the user along X and Y axis as well as the position in longitude and latitude of the user can be obtained and converted into digital signal by A/D converter, and then transmitted to the microcomputer for recording and access.

The signal/position display 20 of the invention has a display screen 29 which, in addition to displaying the information recorded by and for the access of the microprocessor 21 such as geographical position, electronic map or hear pulse record etc., can also display the record of geographical position, orientation and traveling track etc.

Besides, the signal/position display 20 of the invention may further have I/O interface port 27 and key-in equipment 28. By using I/O interface port 27, the signal/position display 20 can download from outside, and record the information such as electronic map to the microprocessor 21 or transmit out the information recorded by the microprocessor 21, and upload the information to equipment outside the system such as personal computer, notebook computer or cell phone. More particularly, the geographical position information of a user's traveling location can be uploaded and transmitted through a cell-phone to a remote monitor for recording and access to enable the remote monitor for positioning user's location to perform the function of monitoring the movement and determining the position of the user.

And, by using the key-in equipment 28 the signal/position display 20 can set initial value of signal/position information or input longitude/latitude position information to the microprocessor 21.

Figure 4:
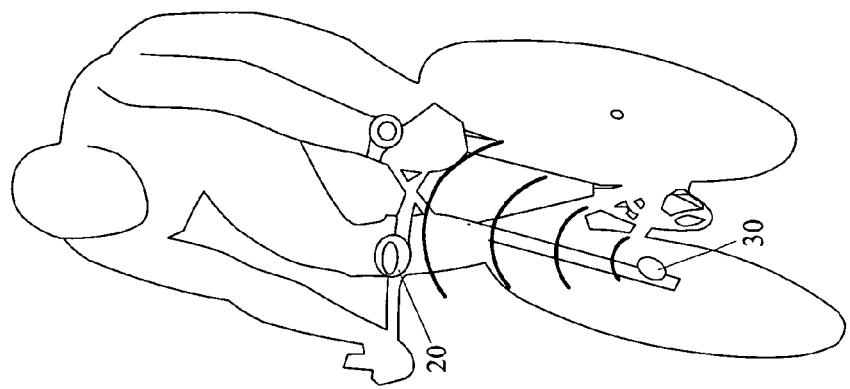
FIG. 4 is the schematic drawing of showing a personal positioner of the invention comprising a signal/position display and a traveling speed/distance measuring sensor separately installed on handlebar and wheel-shaft of a bicycle and the signal being transmitted through wireless signal transmission means.

In addition, as shown in the drawings from FIG. 4 through FIG. 6, the signal/position display 20 can be formed into watchband type for the user to wear on wrist or carried on waist belt, or can be made into the form for being attached to personal articles or vehicles such as attached to overcoat or mountain climbing backpack or on the handlebar of bicycle or on the instrument panel of automobile.

The traveling speed/distance measuring sensor 30 is a high precision speed and distance sensor specially designed for measuring speed/distance such as mechanical vibration sensor, electronic shock sensor or semiconductor two/three axis acceleration sensor which can precisely measure the traveling speed and distance experienced by the user within a period of time, and the measured speed and distance signal are then transmitted to A/D converter 25 by means of wired or wireless transmission for being converted to digital signal which are then transmitted to the microprocessor 21 for recording and access.

As shown in FIG. 4, when the user uses a land traveling means such as a bicycle and a motorcycle, the traveling speed/distance measuring sensor 30 of the invention shall choose to use a rotary type traveling speed/distance measuring sensor 30 which shall be installed on a wheel shaft of the bicycle or motorcycle used that the speed and distance traveled by the bicycle and motorcycle can be precisely measured.

When the user uses a traveling means such as a yacht at sea, or uses a land traveling means such as a vehicle, the traveling speed/distance measuring sensor 30 shall choose to use a cruising speed/distance sensor which can directly and precisely measure the cruising speed and traveling distance of the traveling means at sea or the vehicle.

As shown in FIG. 7, when the user travels by walking or running the traveling speed/distance measuring sensor 30 shall choose to use a traveling speed/distance measuring sensor designed by applying the theory that the stride length is proportional to stride rate which can precisely calculate the speed of the user in walking, jogging, running and sprint and the traveling distance based on different conditions of the user, and the manner of use of the traveling speed/distance measuring sensor 30 may include carrying it on wrist or on the lower part of leg or carrying it on waist-belt or on shoelace as shown in FIG. 5 or FIG. 6.

Figure 3:
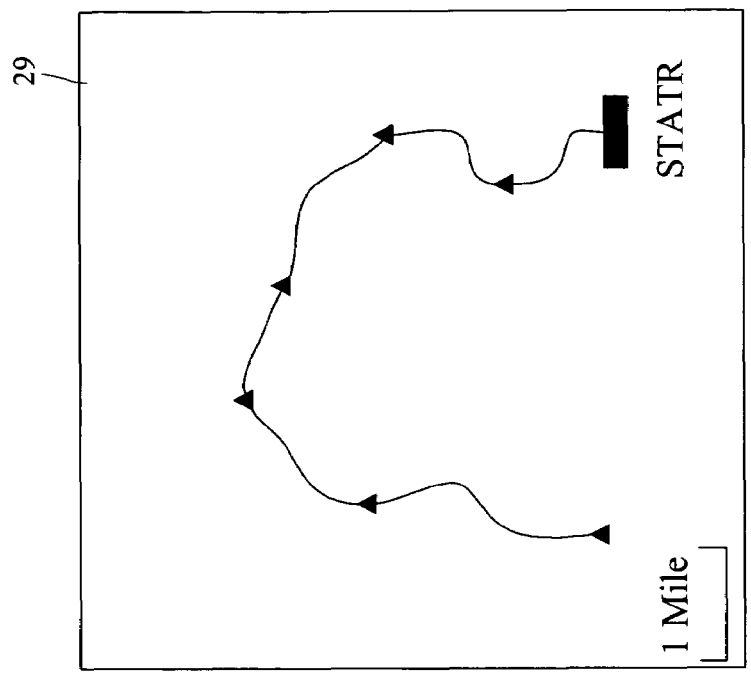
FIG. 3 is the schematic drawing of showing a personal positioner of the invention having LCD screen to display information of speed, distance, geographical position and traveled track experienced by the user within a specific period of time.
Figure 3:
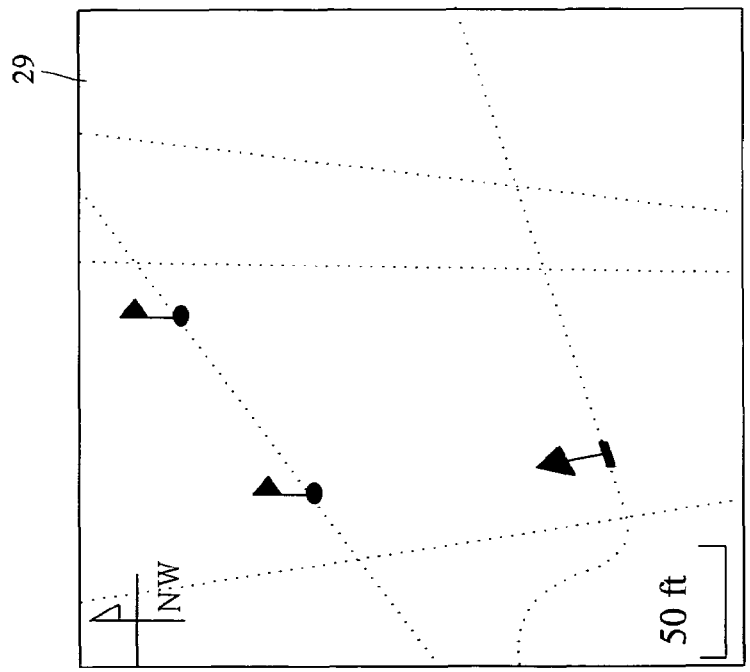

Therefore, as illustrated in FIG. 1 and FIG. 2, the personal positioner 10 of the invention achieves the function of positioning by the access of the signal transmitted to the speed/distance measuring sensor 30 through either wired or wireless transmission means by the microprocessor. 21 of the signal/position display 20. Meanwhile, the orientation signal along X and Y axis as well as the altitude position signal along Z axis obtained by employing magneto-resistive sensor (or electronic compass) 24 and altimeter 23 respectively are processed through data calculation, statistical computation, superposition and graphic data processing, as shown in FIG. 3, to obtain the speed, distance, geographical position and track traveled experienced by the user, and these data can be selected by the user for displaying on the LCD screen 29 of the signal/position display 20 to achieve the function of determining the geographical position without the need to employ Satellite Navigation System of GPS.

Besides, as shown in FIG. 1 and FIG. 6, when the user is going out, and carrying a wireless cardiac pulse signal transmitter 46 by binding the transmitter 46 on the chest with a chest belt 49 to detect the cardiac pulse signal, the detected pulse signal is transmitted through either wired or wireless transmission means to the microprocessor 21 for recording and direct access, so the user may also select to display the electrocardiogram or the detected heart pulse data on the LCD screen 29 of the signal/position display 20.

What is claimed is:

1. A portable personal positioner comprising a signal/position display and a traveling speed/distance measuring sensor to display data of speed, distance, geographical position and track to a user, wherein said signal/position display comprises a microprocessor, an A/D converter, and a magneto-resistive sensor to measure orientation along X and Y axis and angular displacement of a user and transmit measured data to the microprocessor for recording and access through A/D converter; and said traveling speed/distance measuring sensor to precisely measure speed and distance experienced by a user within a period of time, and transmit the measured data to the microprocessor for recording and access through A/D converter.

2. The personal positioner according to claim 1, wherein the magneto-resistive sensor of said signal position display is an electronic compass, a magnetometer, or a fluxgate compass.

3. The personal positioner according to claim 1, wherein said signal/position display has an altitude sensor for measuring atmospheric pressure at a location, converting the pressure into altitude data along Z axis, and transmitting the measured data through A/D converter to the microprocessor for recording and access.

4. The personal positioner according to claim 3, wherein said traveling speed/distance measuring sensor is a sensor to precisely measure and calculate traveling speed/distance of a user in walking, jogging, running and sprint.

5. The personal positioner according to claim 3, wherein said traveling speed/distance measuring sensor is a mechanical vibration sensor, an electronic shock sensor or a semiconductor two/three axis acceleration sensor.

6. The personal positioner according to claim 3, wherein said traveling speed/distance measuring sensor is a rotary type traveling speed/distance measuring sensor installed on a wheel shaft of a bicycle or motorcycle.

7. The personal positioner according to claim 3, wherein said traveling speed/distance measuring sensor is a cruising speed/distance sensor for measuring cruising speed and traveling distance.

8. The personal positioner according to claim 3, wherein said signal/position display has I/O interface port for downloading information to the microprocessor or up-loading information from the microprocessor.

9. The personal positioner according to claim 3, wherein said signal/position display has key-in equipment to set initial value or input information to the microprocessor.

10. The personal positioner according to claim 3, wherein the personal positioner is further incorporated with a cardiac pulse signal detector to transmit detected heart pulse signal to the microprocessor for recording and access.

11. A personal positioner comprising a signal/position display and a wireless speed/distance signal transmitter to display data of speed, distance, geographical position and track to a user, wherein said signal/position display comprises a microprocessor, an A/D converter, a speed/distance radio signal receiver, and a magneto-resistive sensor to measure orientation along X and Y axis and angular displacement of a user and transmit measured data to the microprocessor for recording and access through A/D converter; and the wireless speed/distance signal transmitter to precisely measure speed and distance experienced by a user within a period of time, and transmit the measured data by means of radio-frequency signal transmission or infrared rays signal transmission to the speed/distance radio signal receiver of said signal/position display and further to the microprocessor for recording and access through A/D converter.

12. The personal positioner according to claim 11, wherein the magneto-resistive sensor of said signal position display is an electronic compass, a magnetometer, or a fluxgate compass.

13. The personal positioner according to claim 11, wherein said signal/position display has an altitude sensor for measuring atmospheric pressure at a location, converting the pressure into altitude data along Z axis, and transmitting the measured data through A/D converter to the microprocessor for recording and access.

14. The personal positioner according to claim 13, wherein said wireless speed/distance signal transmitter is a wireless transmitter to precisely measure and calculate traveling speed/distance of a user in walking, jogging, running and sprint.

15. The personal positioner according to claim 13, wherein said wireless speed/distance signal transmitter with waist-belt shall be carried on user's wrist or lower part of leg.

16. The personal positioner according to claim 13, wherein said traveling speed/distance measuring sensor is a rotary type traveling speed/distance measuring sensor installed on a wheel shaft of a bicycle or motorcycle.

17. The personal positioner according to claim 13, wherein said traveling speed/distance measuring sensor is a cruising speed/distance sensor for measuring cruising speed and traveling distance.

18. The personal positioner according to claim 13, wherein said signal/position display has I/O interface port for downloading information to the microprocessor or up-loading information from the microprocessor.

19. The personal positioner according to claim 13, wherein said signal/position display has key-in equipment to set initial value or input information to the microprocessor.

20. The personal positioner according to claim 13, further comprising a wireless cardiac pulse radio signal transmitter to detect heat pulse of a user, and a cardiac pulse radio signal receiver installed in the signal/position display for receiving radio-frequency signal or infrared rays signal transmitted from the wireless cardiac pulse radio signal transmitter, and transmitting the signal to the microprocessor for recording and access.

21. The personal positioner according to claim 18, wherein the I/O interface port is provided through a cell-phone to up-load and transmit a geographical position information from the microprocessor to a remote monitor for recording and access and for positioning user's location.

* * * * *